US009013465B2

(12) United States Patent
Chung

(10) Patent No.: US 9,013,465 B2
(45) Date of Patent: Apr. 21, 2015

(54) ORGANIC LIGHT EMITTING DISPLAY AND DRIVING METHOD THEREOF

(75) Inventor: Ho-Ryun Chung, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 373 days.

(21) Appl. No.: 13/237,836

(22) Filed: Sep. 20, 2011

(65) Prior Publication Data

US 2012/0169704 A1 Jul. 5, 2012

(30) Foreign Application Priority Data

Jan. 4, 2011 (KR) ........................ 10-2011-0000599

(51) Int. Cl.
*G06F 3/038* (2013.01)
*G09G 3/32* (2006.01)

(52) U.S. Cl.
CPC ...... *G09G 3/3233* (2013.01); *G09G 2300/0861* (2013.01); *G09G 2320/0295* (2013.01); *G09G 2320/045* (2013.01)

(58) Field of Classification Search
None
See application file for complete search history.

(56) References Cited

U.S. PATENT DOCUMENTS

| | | | | |
|---|---|---|---|---|
| 2008/0231562 | A1* | 9/2008 | Kwon | 345/77 |
| 2011/0080433 | A1* | 4/2011 | Park | 345/690 |
| 2011/0115832 | A1* | 5/2011 | Lee et al. | 345/690 |
| 2011/0134157 | A1* | 6/2011 | Chaji | 345/690 |
| 2012/0062545 | A1* | 3/2012 | Kim | 345/212 |

FOREIGN PATENT DOCUMENTS

| | | | |
|---|---|---|---|
| KR | 10-2008-0090625 | A | 10/2008 |
| KR | 10-2008-0090923 | A | 10/2008 |
| KR | 10-2009-0046536 | A | 5/2009 |

* cited by examiner

*Primary Examiner* — David D Davis
(74) *Attorney, Agent, or Firm* — Knobbe Martens Olson & Bear LLP

(57) ABSTRACT

An organic light emitting diode (OLED) display is disclosed. According to one aspect, the OLED display includes pixels including an OLED and a driving transistor for supplying a driving current according to an image data signal to the OLED. The display includes a sensor configured to sense a first current flowing to the driving transistor corresponding to a source data input signal. An operation voltage of a saturation region of the driving transistor is measured based on performance information of the OLED by using the same current amount as the first current. A voltage controller is configured to determine a minimum electroluminescence voltage for driving the pixels based on information received from the sensor. A power supply is configured to control a power source voltage applied to the pixels according to the determined electroluminescence voltage, and supply the determined power source voltage.

18 Claims, 9 Drawing Sheets

ORGANIC LIGHT EMITTING DISPLAY AND DRIVING METHOD THEREOF

CROSS-REFERENCE TO RELATED APPLICATIONS

This application claims priority to and the benefit of Korean Patent Application No. 10-2011-0000599 filed in the Korean Intellectual Property Office on Jan. 4, 2011, the entire contents of which are incorporated herein by reference.

BACKGROUND

1. Field

The disclosed technology relates to an organic light emitting diode (OLED) display and a driving method thereof. More particularly, the disclosed technology relates to an organic light emitting diode (OLED) display for reducing power consumption by optimizing a driving voltage applied to a display panel, and a driving method thereof.

2. Description of the Related Technology

Recently, various flat panel displays have been developed which have a reduced weight and volume relative to conventional cathode ray tubes. Flat panel displays may include a liquid crystal display (LCD), a field emission display (FED), a plasma display panel (PDP), an organic light emitting diode (OLED) display, and the like.

Among these flat panel displays, an OLED display which generates light by recombining electrons and holes, has attracted greater attention due to its fast response speed, low power consumption, and excellent emission efficiency, luminance, and viewing angle.

In a flat panel display, a display panel is formed by arranging a plurality of pixels on a substrate in a matrix. A data signal is selectively transferred to each pixel by connecting a scan line and a data line to each pixel. Based on the transferred data signals, an image is displayed.

Typically, the OLED display is classified into a passive matrix organic light emitting diode (PMOLED) display and an active matrix organic light emitting diode (AMOLED) display according to a driving method of the OLED.

In a point of resolution, contrast, and operation speed, the AMOLED display which selectively emits light from every unit pixel has been widely used.

However, through repeated use of the display, the performance of the OLED is reduced such that the luminance of light emitted by each pixel in response to the same data signal is gradually reduced. Additionally, a problem in displaying uniform images exists due to non-uniformity of a threshold voltage and mobility of a driving transistor included in each pixel. Therefore, in order to emit light from the pixels with high luminance in conventional displays, power consumption of the display panel is increased.

Therefore, there exists an need for an OLED display capable of adapting to changes in efficiency caused by a reduction in performance of the OLED such that power consumption is reduced in consideration of the optimal voltage for operating a driving transistor of the pixels in the saturation region. Additionally, there exits a need for a driving method of a display capable of reducing power consumption by adapting to changes in efficiency of the display.

The above information disclosed in this Background section is only for enhancement of understanding of the background of the invention and therefore it may contain information that should not be considered prior art.

SUMMARY OF CERTAIN INVENTIVE ASPECTS

The disclosed embodiments have been made in an effort to provide an OLED display for reducing power consumption when driven by an optimal driving voltage in consideration of reduced efficiency caused by a reduction in performance of the OLED and the aging characteristic of the driving transistor.

According to one aspect, an organic light emitting diode (OLED) display is disclosed. The OLED display includes a plurality of pixels including an OLED and a driving transistor configured to supply a driving current according to an image data signal to the OLED, a sensor configured to sense a first current flowing to the driving transistor based on a source data input signal according to a target luminance value, and measure an operation voltage of a saturation region of the driving transistor and performance information regarding reduced performance of the OLED by using a current amount equal to the first current, a voltage controller configured to determine a minimum electroluminescence voltage for driving the plurality of pixels by using the measured performance information, a power supply configured to control a power source voltage applied to the plurality of pixels according to the determined electroluminescence voltage, and a controller configured to control image display of the plurality of pixels, the controller further configured to drive the sensor, the voltage controller, and the power supply.

According to another aspect, a method for driving an organic light emitting diode (OLED) display is disclosed. The method includes transmitting a source data input signal according to target luminance to a driving transistor included in a plurality of respective pixels, and sensing a first current flowing to the driving transistor in response to the source data input signal, measuring an operation voltage of a saturation region of the driving transistor by sinking a second current having the same current amount as the first current from the driving transistor, measuring information indicative of a level of performance of the OLED by supplying a third current having the same current amount as the first current to an OLED included in the plurality of pixels, determining a minimum electroluminescence voltage for driving the plurality of pixels by using the operation voltage of the saturation region of the measured driving transistor and the measured performance information controlling a power source voltage applied to the plurality of pixels according to the determined electroluminescence voltage, and supplying the controlled power source voltage.

DETAILED DESCRIPTION OF CERTAIN INVENTIVE EMBODIMENTS

Figure 1:
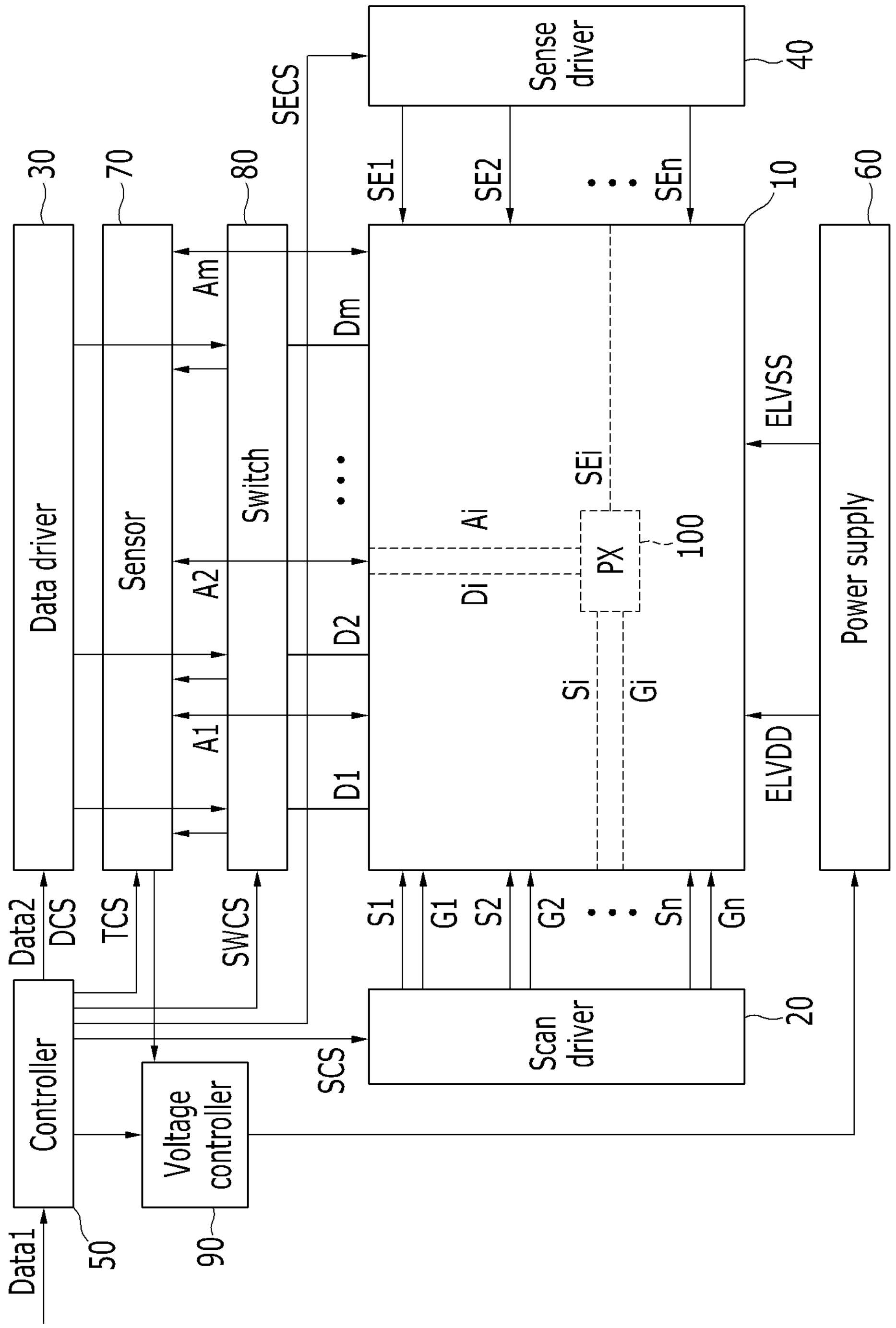
FIG. 1 shows a block diagram of an OLED display according to some embodiments.

The disclosed embodiments will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in the exemplary embodiments, like reference numerals designate like elements throughout the specification and are described with reference to a first exemplary embodiment. A description of like elements may be omitted such that only elements other than those of the first exemplary embodiment will be described in subsequent embodiments. The drawings and description are to be regarded as illustrative in nature and not restrictive.

Throughout this specification and the claims that follow, when it is described that an element is “coupled” to another element, the element may be “directly coupled” to the other element or “electrically coupled” to the other element through a third element. In addition, unless explicitly described to the contrary, the word “comprise” and variations such as “comprises” or “comprising” will be understood to imply the inclusion of stated elements but not the exclusion of any other elements.

FIG. 1 shows a block diagram of an OLED display according to some embodiments.

The OLED display includes a display 10, a scan driver 20, a data driver 30, a sense driver 40, a controller 50, a power supply 60, a sensor 70, a switch 80, and a voltage controller 90.

The display 10 includes a plurality of pixels 100 connected to scan lines (S1 to Sn) and gate lines (G1 to Gn) connected to the scan driver 20, sense lines (SE1 to SEn) connected to the sense driver 40, data lines (D1 to Dm) connected to the data driver 30, and first connecting lines (A1 to Am) connected to the sensor 70.

With reference to FIG. 1, each pixel 100 is connected to a corresponding scan line (Si) from among the scan lines (S1 to Sn), a corresponding gate line (Gi) from among the gate lines (G1 to Gn), a corresponding sense line (SEi) from among the sense lines (SE1 to SEn), a corresponding data line (Di) from among the data lines (D1 to Dm), and a corresponding first connecting line (Ai) from among the first connecting lines (A1 to Am).

The pixels of the display 10 receive a first power source voltage (ELVDD) and a second power source voltage (ELVSS) from the power supply 60. The pixels control the current supplied to the second power source voltage (ELVSS) from the first power source voltage (ELVDD) through the OLED in correspondence with an image data signal. The OLED emits light of predetermined luminance corresponding to the image data signal.

Conventionally, the driving voltage (a voltage difference between the first power source voltage and the second power source voltage) of the pixels is excessively set, thereby increasing the power consumption of the display. The driving voltage is configured to set a saturation region operating margin of a driving transistor of each pixel and an operating margin caused by a reduction in performance of the OLED is maximized.

The OLED display according to some embodiments substantially reduces the power consumption by setting the driving voltage of the pixels with an optimized value to which an appropriate operation margin is applied.

The scan driver 20 generates a scan signal and a gate signal and transmits them to the scan lines (S1 to Sn) and the gate lines (G1 to Gn).

The data driver 30 transmits a plurality of image data signals (Data2) to the data lines (D1 to Dm). The image data signals (Data2) are converted from a plurality of video signals (Data1) and are then transmitted to the data driver 30 by the controller 50.

The sense driver 40 generates a sense signal and transmits it to the sense lines (SE1 to SEn).

The sensor 70 senses a current or a voltage of the pixels for calculating an optimal driving voltage through sensor connecting lines (A1 to Am) connected to the pixels of the display 10 and the data lines (D1 to Dm) shared by the switch 80.

When the sensor 70 uses a data line to measure a current of the pixels though a current output line, the switch 80 is configured to select from among the data lines (D1 to Dm) corresponding to the pixel to be sensed. That is, the switch 80 selectively connects the sensor 70 and the data driver 30 to the data lines (D1 to Dm). For this purpose, the switch 80 can include a pair of switches connected to the data lines (D1 to Dm) (i.e., for each channel). However, this is but one exemplary embodiment, and the sensor 70 can select predetermined pixels from among all pixels of the display 10 and measure the sensing current. As a result, switches of the switch 80 can be provided such that they are connected to the corresponding data lines from among all data lines corresponding to the pixels connected to the sensor 70.

The sensor 70 extracts an operation voltage of the driving transistor included in each pixel in the saturation region and a voltage of the OLED, and supplies the extracted voltage information to the voltage controller 90. The sensor 70 may include a current sensor (not shown) selectively connected to the respective data lines (D1 to Dm) or corresponding data lines. The current sensor may be configured to sense the sensing current that corresponds to the source data input voltage from the corresponding pixels.

In the illustrated example, the time for the sensor 70 to extract the operation voltage of the driving transistor of the pixels and reduction in performance information of the OLED is not specified. Extraction by the sensor 70 can be performed each time power is supplied to the OLED display or before the display device is shipped as a product. The sensor 70 may be configured such that it is operable periodically and automatically. Additionally, or alternatively, the sensor 70 may be configured such that it can be variably operated by according to a user’s setting.

The sensing current output line and the source data input line for testing are shared by using the data lines in an exemplary embodiment illustrated in FIG. 1. However FIG. 1 illustrates only one embodiment, and it should be recognized that the sensing current output line and the source data input line for testing may be separated.

In the example in which sensing current output line and the source data input line are separated for testing, a plurality of sensing current output lines for connecting the sensor 70 and the pixels are to be added in addition to the data lines (D1 to Dm). This will be described in detail with reference to FIG. 3.

The power supply 60 applies the first power source voltage (ELVDD) and the second power source voltage (ELVSS) to the display 10 and provides driving signals to the display 10. The driving voltage (EL voltage) of the display 10 is determined by a voltage difference between the first power source voltage (ELVDD) with a high potential and the second power source voltage (ELVSS) with a low potential.

The voltage controller 90 sets the power source voltage controlled by the controller 50 or the sensor 70 to control application of the driving voltage of the power supply 60. The voltage controller 90 can control the first power source voltage (ELVDD) applied by the power supply 60, or the second power source voltage (ELVSS). The set voltage level determined by the voltage controller 90 is calculated from the voltage information to based on the characteristic of the driving transistor of the pixels extracted from the sensor 70 and the OLED. As a result optimal driving of the display 10 with minimum power consumption is achieved by applying the controlled power source voltage to the display 10.

The voltage controller 90 is realized as an individual element in the exemplary embodiment of FIG. 1, and without being restricted to this, it can be included in the controller 50 or the sensor 70.

The controller 50 generates a plurality of control signals for controlling the scan driver 20, the data driver 30, the sense driver 40, the sensor 70, the switch 80, and the voltage controller 90 and transmits them.

In detail, the controller 50 transmits a scan drive control signal (SCS) to the scan driver 20, and the scan drive control signal (SCS) controls the scan driver 20 to supply the scan signal to the scan lines (S1 to Sn). Additionally, the scan drive control signal (SCS) controls the scan driver 20 to supply the gate signal to the gate lines (G1 to Gn).

Further, the controller 50 transmits a data drive control signal (DCS) to the data driver 30, and the data drive control signal (DCS) controls the data driver 30 to supply the corresponding data signals to the data lines (D1 to Dm).

The controller 50 transmits a sense drive control signal (SECS) to the sense driver 40, and the sense drive control signal (SECS) controls the sense driver 40 to supply a sense signal to the sensing lines (SE1 to SEn).

Furthermore, the controller 50 transmits a sensing control signal (TCS) and a switching control signal (SWCS) to the sensor 70 and the switch 80 respectively.

The sensing control signal (TCS) controls a current sink (not shown) included in the sensor 70 and the switches of the current source (not shown) to control the sensor 70 to extract the operating voltage of the driving transistor of the pixels or information indicative of a level of performance of the OLED.

The switching control signal (SWCS) controls turn-on operations of one pair of switches of the switch 80 for selectively connecting the sensor 70 and the data driver 30 to the data lines (D1 to Dm). Accordingly, the input process of the source data and the output process of the sensing current are controlled. As a result, the process of transmitting the image data by the data driver 30 following the video signal through the data lines (D1 to Dm).

The controller 50 controls the voltage controller 90 to set the supply voltage of the power supply 60 according to the method for driving an OLED display according to some embodiments. However, this is but one exemplary embodiment, and the controller 50 can perform the function of the voltage controller 90.

Figure 2A:
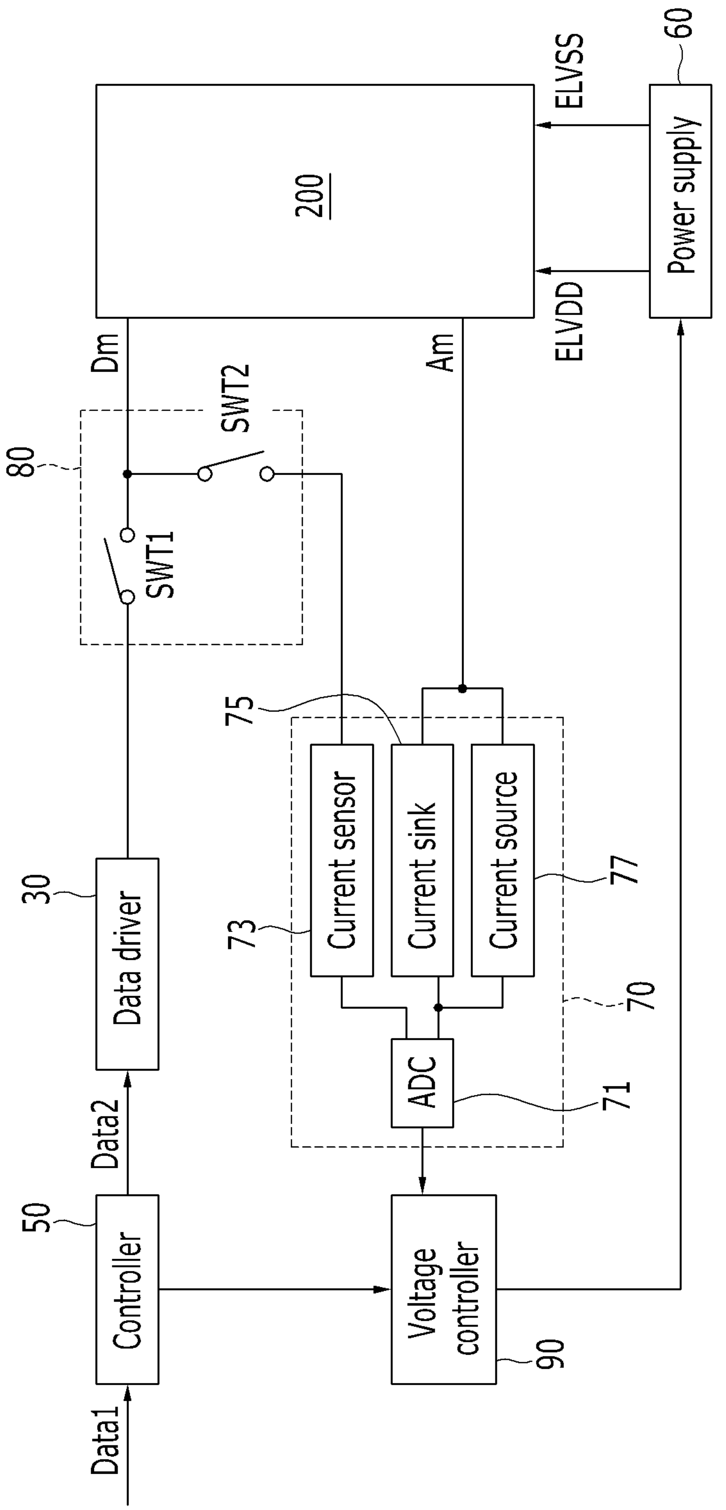
FIG. 2A and FIG. 2B show a partial block diagram and a partial circuit diagram of the OLED display shown in FIG. 1 according to some embodiments.
Figure 2B:
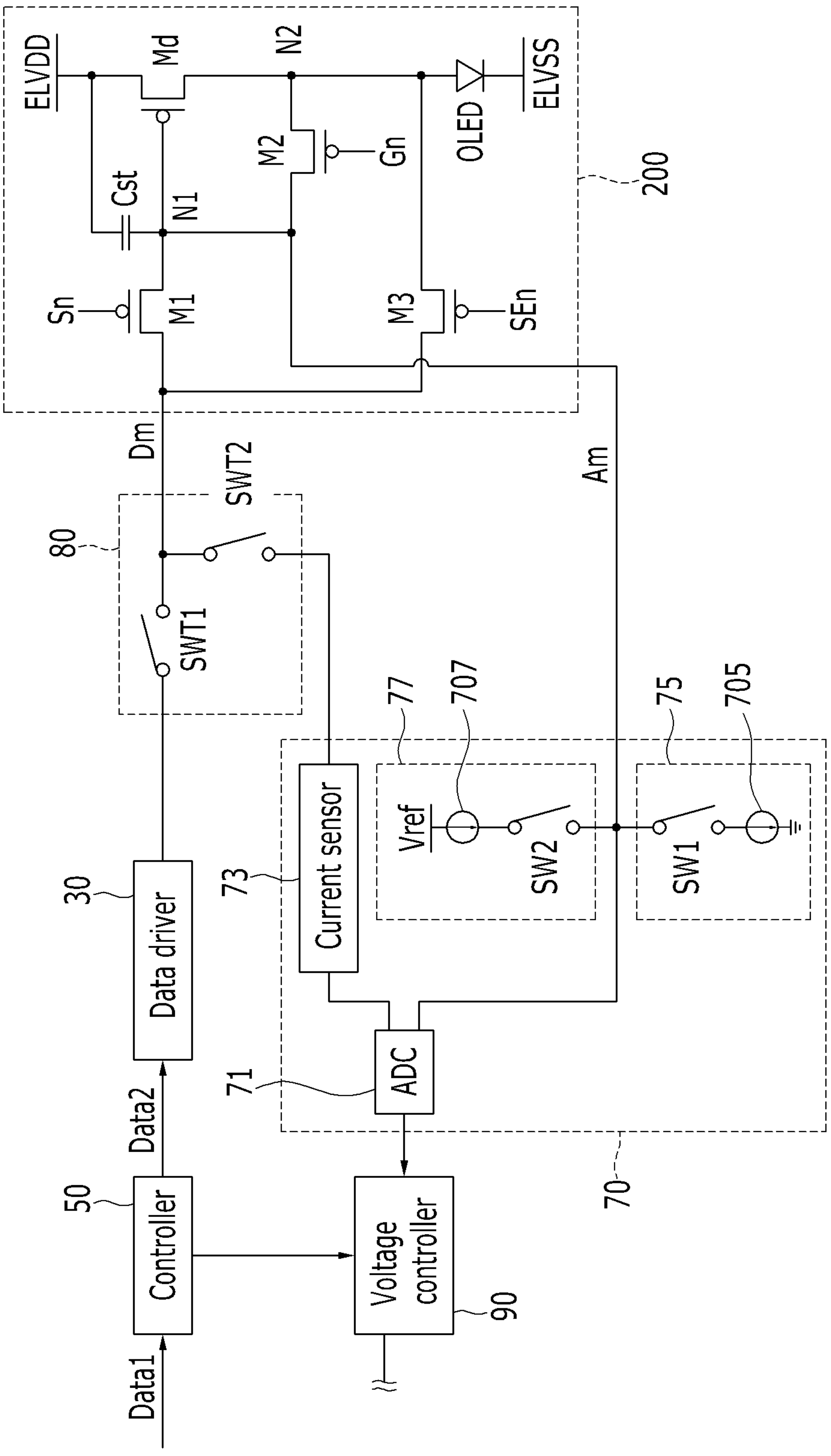

FIG. 2A and FIG. 2B show a partial block diagram and a partial circuit diagram of a sensor 70, a switch 80, and a pixel 100 shown in FIG. 1 according to some embodiments.

The configuration of the OLED display according to the illustrated embodiment except the sensor 70, the switch 80, and the pixel 100 is described with reference to FIG. 1 and will be omitted.

FIG. 2A and FIG. 2B show a sensor 70 and a switch 80 connected to the m-th data line Dm connected to a pixel 200 included in the m-th pixel column and the m-th first connecting line (Am).

With reference to FIG. 2A, the sensor 70 includes a current sensor 73, a current sink 75, a current source 77, and an analog-digital converter (ADC) 71 connected thereto.

The current sensor 73 is a sensing circuit for receiving a sensing current from the pixel 200. The current sensor 73 is connected to the data line Dm data line Dm to the pixel 200 through the switch 80, and senses a sensing current of the pixel.

That is, the pixel 200 receives a source data input signal, and transmits a current of the driving transistor corresponding to the input data signal to the current sensor 73 through the data line Dm. In this instance, the switch 80 selects the source data input signal or the sensing current through the data line Dm. In the first exemplary embodiment in which the data line Dm is shared, the data signal is transmitted or the sensing current is sensed, which simplifies the design of the circuitry in the display.

The switch 80 includes a first selecting switch SWT1 and a second selecting switch SWT2.

The first selecting switch SWT1 is provided on a line connected to the data driver 30, and transmits the image data signal (Data2) according to the external video signal or the source data input signal for testing voltage control to the pixel 200 through the data line Dm when the switch is turned on.

The second selecting switch SWT2 is provided on a line connected to the current sensor 73 of the sensor 70, and transmits the sensing current of the pixel 200 to the current sensor 73 through the data line Dm when the switch is turned on.

The current sensor 73 is not restricted to the above described circuit configuration. However, the current sink may be configured to use the current sink configuration.

The sensing current acquired from the current sensor 73 is transmitted to the ADC 71, and the ADC 71 converts the received sensing current signal to a digital value.

Although not shown in FIG. 2A, the sensor 70 may further include a storage unit. The storage unit can store the voltage values acquired from the ADC 71.

The current sink 75 and the current source 77 included in the sensor 70 in FIG. 2A are connected to the first connecting line (Am) connecting the sensor 70 and the pixel 200.

The current sink 75 sinks the same current as the sensing current through the first connecting line (Am), and the ADC 71 connected to the current sink 75 acquires a voltage following the characteristic of the driving transistor of the pixel through current sinking.

Also, the current source 77 applies the same current as the sensing current to the OLED of the pixel through the first connecting line (Am), and the ADC 71 connected to the current source 77 finds the voltage following the performance characteristic of the OLED of the pixel.

FIG. 2B shows a circuit diagram of a sensor 70 and a pixel 200 shown in FIG. 2A, showing a connection of the pixel 200, the sensor 70, and the switch 80 in detail.

In the case of the first exemplary embodiment in which the source data input line and the output line of the sensing current are selectively connected to the data line Dm, FIG. 2B shows a circuit configuration of a pixel including a first transistor M1 connected to the data line Dm and a sense transistor M3 connected to a line diverged from the data line Dm.

Further, with reference to FIG. 2B, the first connecting line (Am) connecting the current sink 75 and the current source 77 of the sensor 70 to the pixel is connected to the pixel 200.

That is, the pixel 200 includes a second transistor M2 connected to the first connecting line (Am), and a storage capacitor (Cst) and a driving transistor (Md) are connected to a first node N1 to which the second transistor M2 is connected. A detailed circuit configuration and a drive process of the pixel 200 will be described with reference to FIG. 4 to FIG. 8B.

In FIG. 2B, the current sink 75 included in the sensor 70 of the OLED display according to some embodiments includes a sink current source 705 for sinking the current to detect the operation voltage of the variable saturation region which varies as a result of the aging characteristic of the driving transistor (Md) of the pixel 200. The current source additionally includes a first switch SW1 for controlling the current sink 75.

The current source 77 included in the sensor 70 includes a source current source 707 for supplying the current to the OLED to detect the driving voltage variable by the performance characteristic of the OLED of the pixel 200, and a second switch SW2 for controlling the current source 77.

A first end of the sink current source 705 is connected to ground and a second end thereof is connected to the first switch SW1. A first end of the source current source 707 is connected to a power supply for applying a reference voltage (Vref), and the other end of the current source 707 is connected to the second switch SW2.

Figure 3:
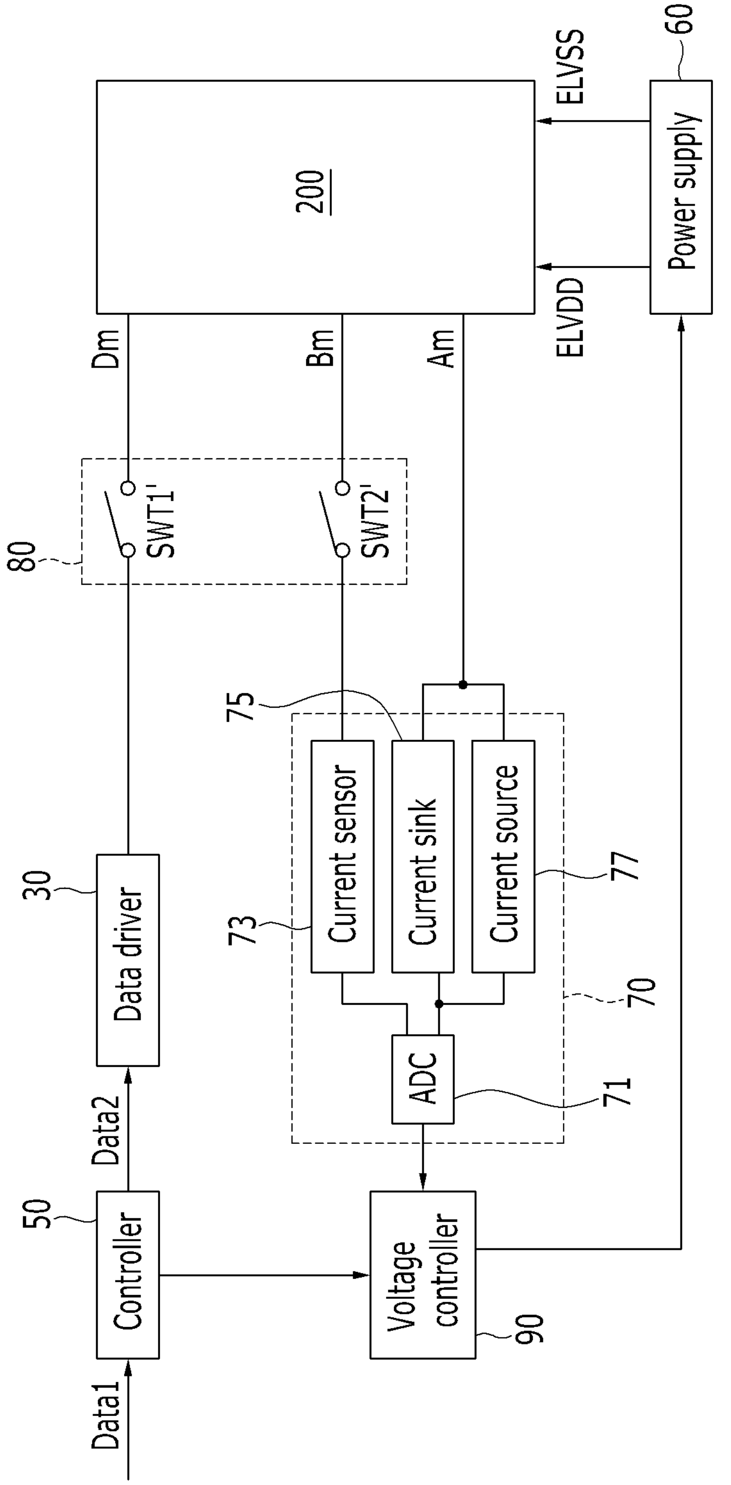
FIG. 3 shows a partial block diagram of the OLED display shown in FIG. 1 according to some embodiments.

FIG. 3 shows a block diagram of a sensor 70, a switch 80, and a pixel 100 shown in FIG. 1 according to another exemplary embodiment.

Differing from the first exemplary embodiment shown in FIG. 2A and FIG. 2B, the circuit elements such as the sensor 70, the switch 80, and the pixel 200 of the OLED display according to the second exemplary embodiment shown in FIG. 3 uses the sensing current output line of the pixel 200 corresponding to the source data input signal, separated from the data line Dm. That is, in the second exemplary embodiment, the OLED display uses the data line Dm for the source data input line and also uses a second connecting line (Bm) for the output line of the sensing current. The circuit configuration according to the second exemplary embodiment simplifies the control signal relative to the first exemplary embodiment.

A switch is provided to the data line (Dm) and the second connecting line (Bm), respectively, so as to control transmission of the image data signal (Data2) to the pixel 200, or transmission of the source data input signal for changing the voltage and outputting of the sensing current. The switch 80 includes a first selecting switch (SWT1') for controlling a signal flow of the data line Dm and a second selecting switch (SWT2') for controlling a current flow of the second connecting line (Bm).

Additionally, the current sink 75 and the current source 77 of the sensor 70 according to the exemplary embodiment of FIG. 3 are connected to the pixel 200 through the first connecting line (Am).

Figure 4:
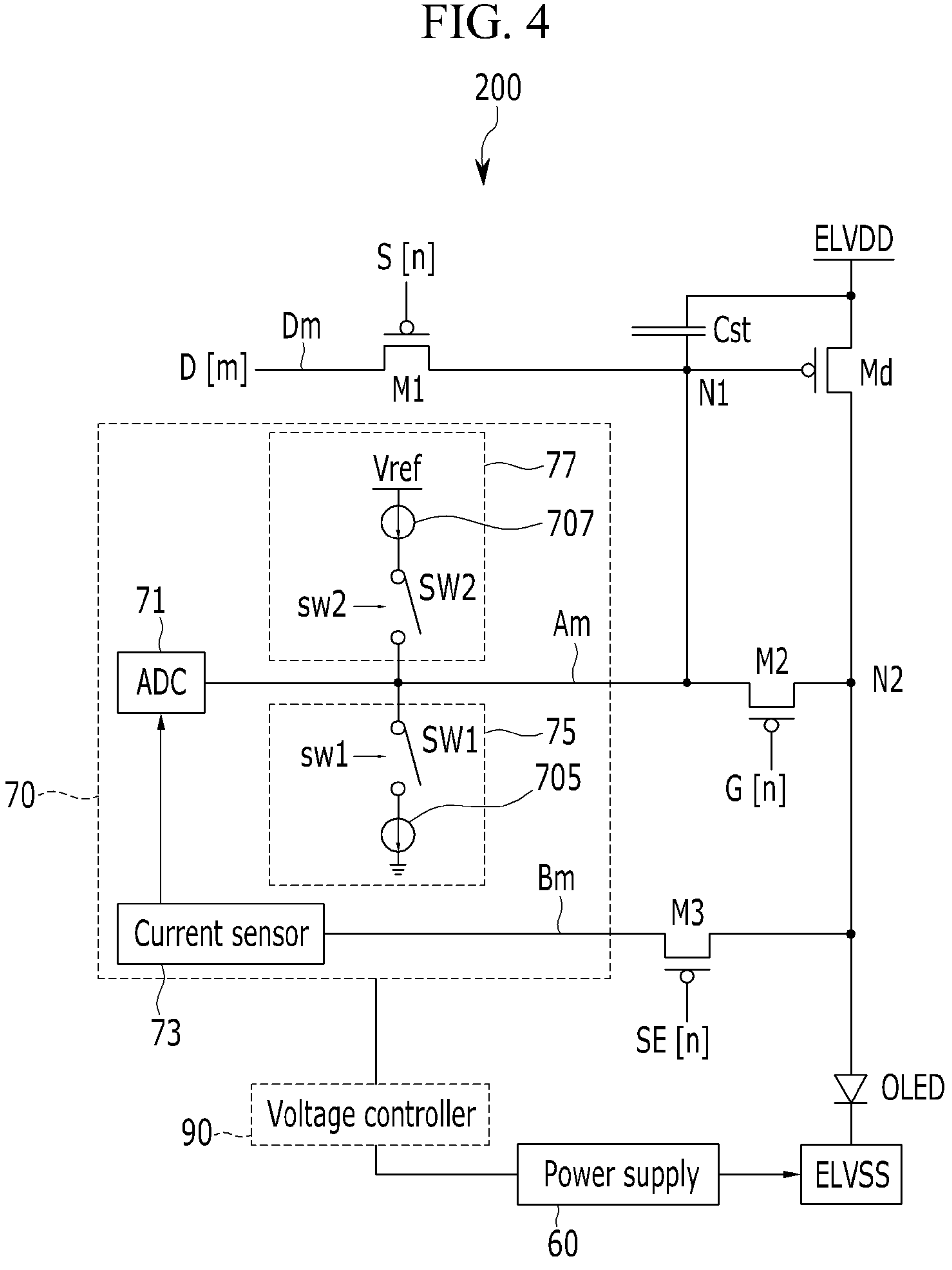
FIG. 4 shows a circuit diagram of a pixel of an OLED display according to some embodiments.

FIG. 4 shows a circuit diagram of a pixel of an OLED display according to some embodiments.

For better understanding and ease of description, FIG. 4 illustrates an example of a circuit diagram of the pixel 200 at the position corresponding to the n-th pixel line and the m-th pixel column from among all pixels of the display 10. Therefore, the pixel 200 shown in FIG. 4 is connected to the n-th scan line, the n-th gate line, the n-th sense line, and the m-th data line to receive an image data signal from the data line Dm. Additionally, the pixel 200 includes a first connecting line (Am) for transmitting voltage information corresponding to the characteristic of the pixel 200 so as to control the voltage.

Particularly, FIG. 4 shows the pixel 200 according to the second exemplary embodiment shown in FIG. 3, and the pixel 200 of FIG. 4 has a second connecting line (Bm) as a sensing current output line of the pixel 200 in addition to the data line Dm. In the example in which the pixel corresponds to a pixel as described with reference to FIG. 2A and FIG. 2B above, the data line Dm is shared such that it is used as a sensing current output line without using an additional second connecting line (Bm).

In detail, the pixel 200 of FIG. 4 includes an OLED, a driving transistor Md, a first transistor M1, a second transistor M2, a sense transistor M3, and a storage capacitor Cst.

The pixel 200 includes an OLED for emitting light according to the driving current input to the anode, and a driving transistor (Md) for transmitting the driving current to the OLED.

The driving transistor (Md) is provided between the anode of the OLED and the first power source voltage (ELVDD) to control the current flowing to the second power source voltage (ELVSS) from the first power source voltage (ELVDD) through the OLED.

A gate electrode of the driving transistor (Md) is connected to the first node N1, the first electrode is connected to the first power source voltage (ELVDD), and the second electrode is connected to the second node M2. The gate electrode of the driving transistor (Md) and the first electrode are connected to both ends of the storage capacitor Cst, and the driving current flowing to the OLED from the first power source voltage (ELVDD) is controlled such that is corresponds with the voltage value of the data signal stored in the storage capacitor Cst. As a result, the OLED emits light corresponding to the driving current supplied by the driving transistor (Md).

The gate electrode of the first transistor M1 is connected to the n-th scan line. The first electrode of the first transistor M1 is connected to the corresponding m-th data line Dm, and the second electrode is connected to the first node N1. The first transistor M1 transmits the data signal (D[m]) to the first node N1 transmitted through the m-th data line Dm in response to the scan signal (S[n]) transmitted through the n-th scan line. The storage capacitor Cst having a first electrode connected to the first node N1 stores the voltage value caused by the difference between the voltage corresponding to the data signal (D[m]) applied to the first node N1 and the first power source voltage (ELVDD) to which a second electrode of the storage capacitor Cst is connected for a predetermined period.

The gate electrode of the second transistor M2 is connected to the corresponding n-th gate line. The first electrode of the second transistor M2 is connected to the corresponding first node N1, and the second electrode is connected to the corresponding second node N2. The first connecting line (Am) for connecting the sensor 70 and the pixel 200 is connected to the first node N1 to which the first electrode of the second transistor M2 is connected. In detail, the first connecting line (Am) to which the current sink 75, the current source 77, and the ADC 71 are connected is connected to the first electrode of the second transistor M2. The second transistor M2 is configured to connect the driving transistor (Md) to the OLED in response to the gate signal (G[n]) transmitted through the n-th gate line.

The gate electrode of the sense transistor M3 is connected to the corresponding n-th sense line. The first electrode of the sense transistor M3 is connected to the corresponding second node N2, and the second electrode is connected to the second connecting line (Bm) connected to the current sensor 73 of the sensor 70. The sense transistor M3 transmits the current flowing to the second node N2 to the current sensor 73 through the second connecting line (Bm) in response to the sense signal (SE[n]) transmitted through the n-th sense line. For example, the current corresponding to the source data input signal applied through the data line Dm for the voltage control is transmitted to the second node N2 through the driving transistor (Md). When the sense transistor M3 is turned on in response to the sense signal (SE[n]), the sensing current of the driving transistor (Md) is transmitted to the current sensor 73 so that the sensor 70 may measure the current. The current sensor 73 transmits the transmitted sensing current to the ADC 71, and the ADC 71 converts the sensing current into the corresponding digital value.

With reference to FIG. 4, the voltage controller 90 connected to the sensor 70 uses the voltage value or the current value transmitted from the sensor 70 to determine an appropriate electroluminescence voltage (EL voltage) according to the characteristic of the driving transistor of the corresponding pixel or the OLED and transmit the same to the power supply 60. In the exemplary embodiment of FIG. 4, the determined electroluminescence voltage is the second power source voltage (ELVSS), and the power supply 60 fixes the first power source voltage (ELVDD) and controls the second power source voltage (ELVSS) with the determined electroluminescence voltage value. In addition, the second power source voltage (ELVSS) can be fixed and the first power source voltage (ELVDD) can be controlled as another exemplary embodiment.

The transistors configuring the pixel 200 of FIG. 4 are illustrated as PMOS transistors as an exemplary embodiment. However, the transistors are not restricted to PMOS transistors and can be configured as NMOS transistors.

A detailed process for setting the driving voltage for respective stages will be described with reference to the pixel circuit diagram and the drive timing diagram illustrated in FIGS. 5A to 8B. The pixel circuit diagram for the respective stages show a partial configuration of the sensor 70, and the transistors configuring the pixel are PMOS transistors as described with reference to the embodiment of FIG. 4.

Figure 5A:
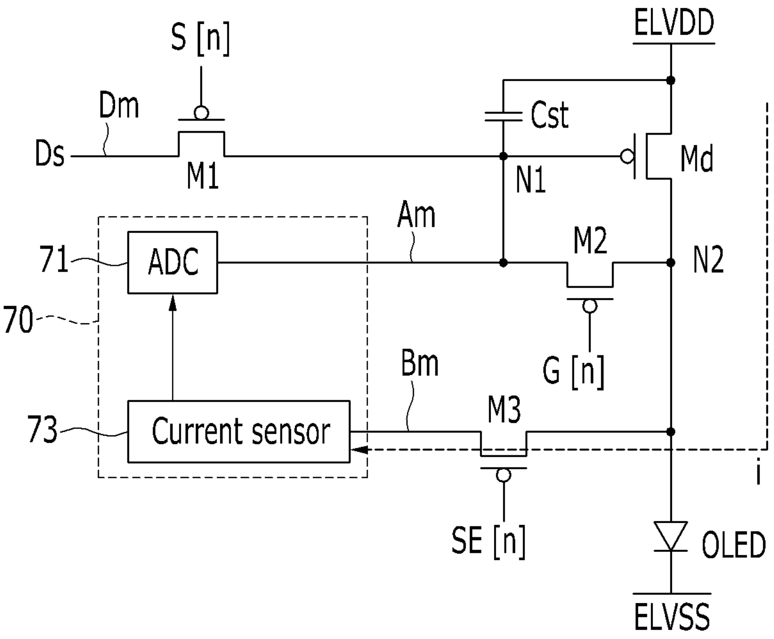
FIG. 5A and FIG. 5B show a pixel circuit diagram and a drive timing diagram for describing a process in a method for driving an OLED display according to some embodiments.
Figure 5B:
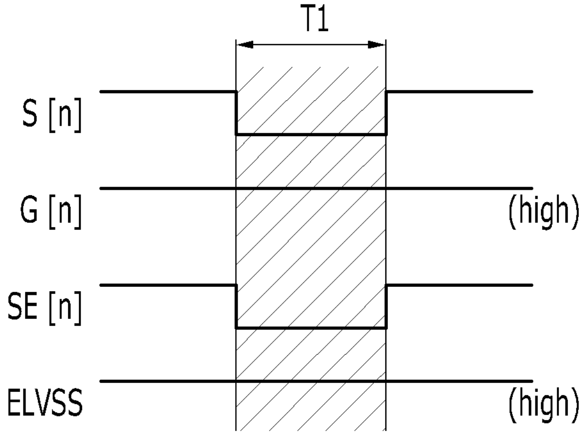

FIG. 5A and FIG. 5B show a process for sensing the driving current according to the source data input signal so as to control the voltage.

With reference to FIG. 5B, the scan signal (S[n]) is transmitted as a pulse with a low voltage level to the pixel in the stage T1 for sensing the sensing current. The first transistor M1 included in the pixel of FIG. 5A is turned on in correspondence with the low level scan signal (S[n]). The source data input signal (Ds) is transmitted from the data line connected to the first electrode of the first transistor M1, and is transmitted to the first node N1 through a channel region of the first transistor M1. The gate electrode of the driving transistor (Md) is connected to the first node N1 so a source data voltage corresponding to the source data input signal is applied to the gate electrode of the driving transistor (Md).

The second transistor M2 is turned off since the corresponding gate signal (G[n]) is transmitted as a high voltage level pulse in FIG. 5B.

For, with reference to FIG. 5B, the sense transistor M3 is turned on since the sense signal (SE[n]) is transmitted as a low level voltage to the gate electrode of the sense transistor M3.

Therefore, the current sensor 73 of the sensor 70 senses the sensing current (i) corresponding to the source data voltage from the driving transistor (Md) through the second connecting line (Bm) connected to the drain electrode of the sense transistor M3 of the pixel.

The current sensor 73 can be configured with a current sink structured circuit, and can sense the current by sinking the sensing current (i) from the path of the second connecting line (Bm), the sense transistor M3, the second node N2, and the driving transistor (Md). The sensing current (i) represents a current that corresponds to a voltage difference between the first power source voltage (ELVDD) connected to the source electrode of the driving transistor (Md) and the source data voltage applied to the gate electrode. That is, the sensing current (i) indicates a current that is sensed from the driving transistor (Md) when the target luminance is set and a voltage corresponding to the source data signal is applied. The sensing current (i) is used to measure the operation voltage of the saturation region of the driving transistor in the subsequent process.

In this instance, as can be known from FIG. 5B, the second power source voltage (ELVSS) connected to the cathode of the OLED is set to be a high level voltage. Therefore, the sensing current (i) does not flow to the OLED but flows to the sensor 70.

The current sensor 73 receives a sensing voltage (Vadc) that corresponds when the sensing current (i) is sunk and supplies the same to the connected ADC 71.

The ADC 71 converts the sensing voltage (Vadc) into a digital signal. The digital sensing voltage information can be stored in a storage unit (not shown). The storage unit can store sensing voltage information from all pixels of the display, and without being restricted to this, it can store sensing voltage information of predetermined pixels selected to control the voltage.

In the exemplary embodiment, the current sensor 73 is separately configured, and it is also possible for the current sink 75 included in the sensor 70 to sense the sensing current (i).

Figure 6A:
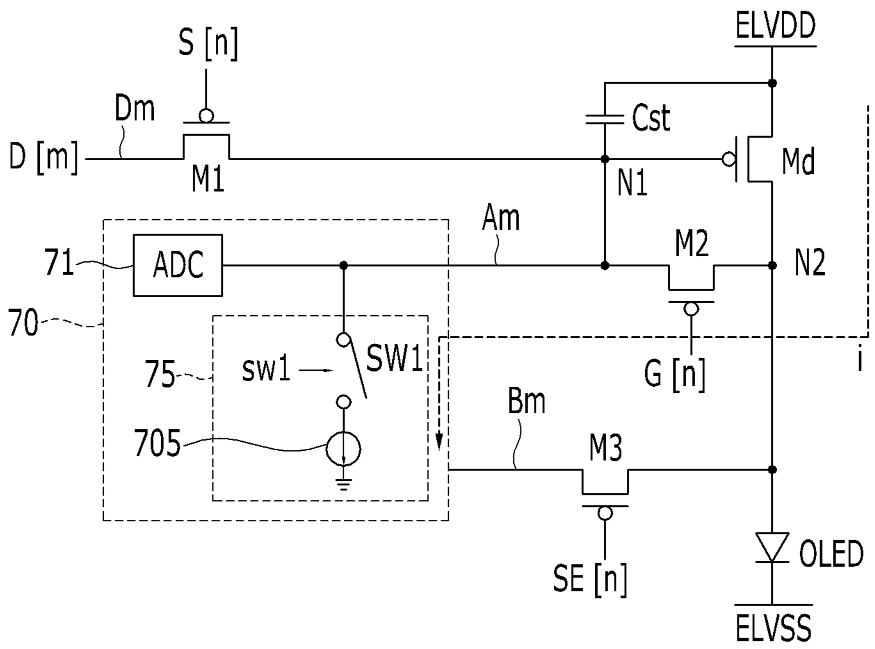
FIG. 6A and FIG. 6B show a pixel circuit diagram and a drive timing diagram for describing a subsequent stage of the process described with reference to FIG. 5A and FIG. 5B.
Figure 6B:
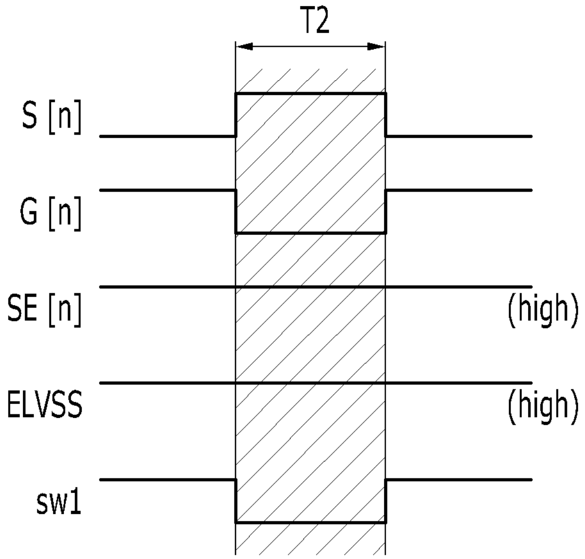

FIG. 6A and FIG. 6B show a pixel circuit diagram and a driving timing diagram for a period T2 for finding an operation voltage in the saturation region of the driving transistor (Md).

With reference to FIG. 6B, the scan signal (S[n]) is transmitted as a high voltage level pulse during the period T2 for finding the operation voltage of the saturation region. When the high level scan signal (S[n]) is transmitted to the first transistor M1 from the pixel of FIG. 6A, the first transistor M1 is turned off. Further, the sense signal (SE[n]) is transmitted as a high voltage level pulse during the period so the sense transistor M3 is turned off.

During the period T2, the gate signal (G[n]) is transmitted as a low voltage level pulse. Upon receiving the low level gate signal (G[n]), the second transistor M2 is turned on. When the second transistor M2 is turned on, the gate electrode and the drain electrode of the driving transistor (Md) are connected to the OLED. The driving transistor (Md) is connected to the OLED and is operable in the saturation region.

During the period T2, the first switch control signal sw1 for controlling the switching operation of the first switch SW1 included in the current sink 75 of the sensor 70 is transmitted as a low voltage level pulse in FIG. 6B so the first switch SW1 is turned on. The first current source 705 sinks the first current as a sink current source. In this instance, the first current is the sensing current (i) sensed from the driving transistor when the source data input signal is applied. Although not shown in the drawing, as can be known from the pixel of FIG. 4, the second switch of the current source 77 included in the sensor 70 and connected to the same node as the current sink 75 is controlled to be turned off.

Further, during the period T2, the second power source voltage (ELVSS) is set to have the high level so that current may not flow to the OLED.

The sensing current (i) of the first current is sunk from the first power source voltage (ELVDD) to which the source electrode of the driving transistor (Md) is connected through the first switch SW1, the first connecting line (Am) to which the second electrode of the second transistor M2 is connected, the second transistor M2, and the driving transistor (Md).

That is, the current sinking process is performed so as to subtract the sensing voltage (Vadc) corresponding to the sensing current (i) acquired from the previous stage (the stage of FIG. 5A and FIG. 5B) from the first power source voltage (ELVDD) by using the ADC 71. Since the driving transistor (Md) is connected to the OLED, the voltage (VDSsat) (hereinafter, the first voltage) between the drain and the source operable in the saturation region can be found. In detail, the first voltage represents a voltage (ELVDD-Vadc) generated by subtracting the voltage (Vadc) that corresponds to the sensing current (i) from the first power source voltage (ELVDD). The characteristic of the driving transistor (Md) operable in the saturation region is applied to the first voltage, the current sink 75 transmits the first voltage to the connected ADC 71, and the ADC 71 converts it into a digital value and stores the same in the storage unit. The storage unit stores first voltage information, an operation voltage in the saturation region of the driving transistor (Md) for all pixels of the display, or stores first voltage information on the measured pixels that are selected to control the voltage.

Figure 7A:
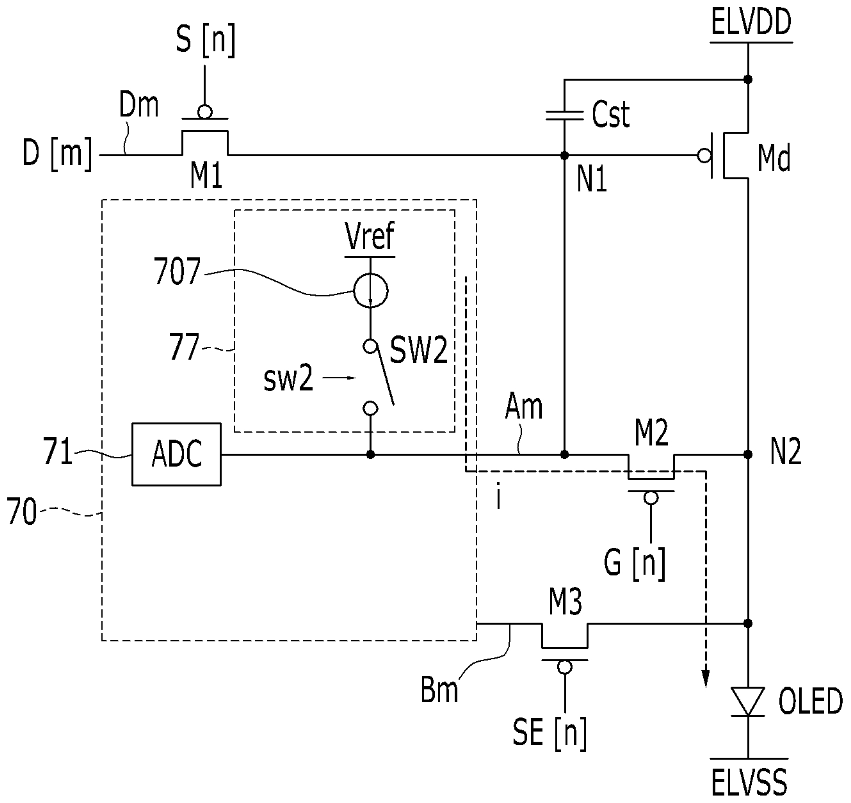
FIG. 7A and FIG. 7B show a pixel circuit diagram and a drive timing diagram for describing a subsequent stage of the process described with reference to FIG. 6A and FIG. 6B.
Figure 7B:
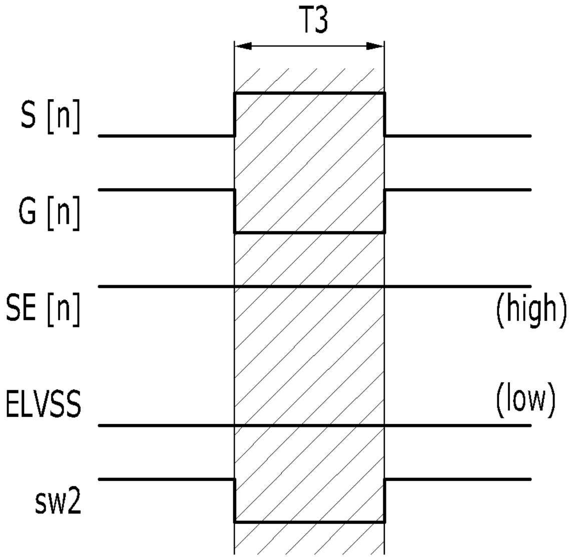

FIG. 7A and FIG. 7B show a pixel circuit diagram and a driving timing diagram for a period T3 for finding a voltage of the OLED to sense performance information of the OLED of the pixel.

With reference to FIG. 7B, a scan signal (S[n]) is transmitted as a high voltage level pulse during the period T3 for finding the voltage of the OLED. When the high level scan signal (S[n]) is transmitted to the first transistor M1 in the pixel of FIG. 7A, the first transistor M1 is turned off. Also, the sense transistor M3 is turned off since the sense signal (SE[n]) is transmitted with the high level.

During the period T3, the gate signal (G[n]) is transmitted as a low voltage level pulse. Upon receiving the low level gate signal (G[n]), the second transistor M2 is turned on.

During the period T3, the second switch SW2 is turned on since the second switch control signal sw2 for controlling the switching operation of the second switch SW2 included in the current source 77 of the sensor 70 is transmitted as a low voltage level pulse in FIG. 7B. The second current source 707 as a source current source supplies the second current. In this instance, the second current represents the sensing current (i) sensed from the driving transistor when the source data input signal is applied. Although not shown in the drawing, as can be known from the pixel of FIG. 4, the first switch of the current sink 75 included in the sensor 70 and connected to the same node as the current source 77 is controlled to be turned off.

Further, during the period T2, the second power source voltage (ELVSS) is set to a low level, so the second current provided by the current source 77 is provided to the OLED through the second switch SW2, the first connecting line (Am) to which the second electrode of the second transistor M2 is connected, and the second transistor M2.

Accordingly, the second voltage, the voltage of the OLED corresponding to the second current generated to the anode of the OLED, is applied to the current source 77, and the second voltage is transmitted to the ADC 71.

The second voltage has performance information of the OLED since the second voltage is different for each pixel according to the performance degree of the OLED of the corresponding pixel when the sensing current (i) is supplied as the second current to the pixel.

The second voltage transmitted to the ADC 71 is converted into a digital value and is stored in the storage unit. The storage unit stores second voltage information, performance information of the OLED for all pixels of the display, or stores second voltage information on the measured pixels that are selected to control the voltage.

The first voltage and the second voltage for all pixels or some selected pixels of the display are found by using the ADC 71 in the above described process. That is, a saturation region voltage of the driving transistor set by the target luminance and a voltage of the OLED for applying the performance degree are acquired. The first voltage and the second voltage information are transmitted to the voltage controller 90 from the ADC 71 of the sensor 70. The voltage controller 90 uses the first voltage and the second voltage to calculate a driving voltage (EL voltage) for electroluminescence of the pixel and transmits it to the power supply. For example, the EL voltage determined by the voltage controller 90 can be determined based on a value for controlling the first power source voltage (ELVDD) or the second power source voltage (ELVSS) from among the external power source voltage applied to the pixel.

Figure 8A:
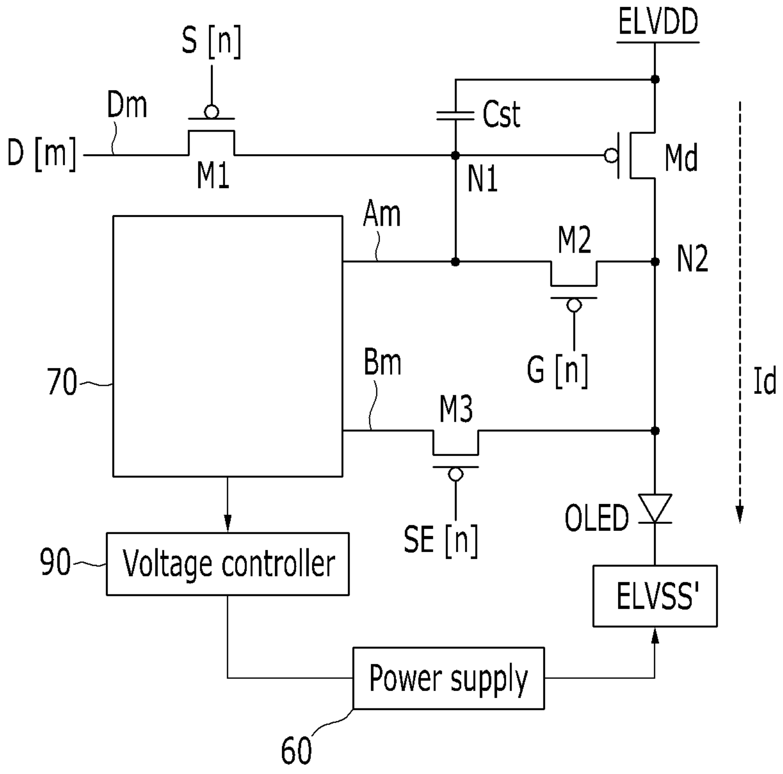
FIG. 8A and FIG. 8B show a pixel circuit diagram and a drive timing diagram for describing a subsequent stage of the process described with reference to FIG. 7A and FIG. 7B.
Figure 8B:
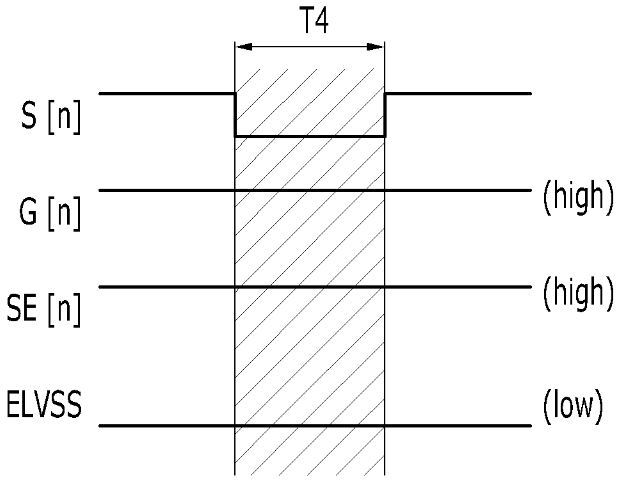

FIG. 8A and FIG. 8B show a pixel circuit diagram and a driving timing diagram for a period T4 for applying a power source voltage controlled with the EL voltage value determined by the voltage controller 90 through a power supply (not shown) and controlling the pixel to emit light according to the video signal.

FIG. 8A illustrates an example in which the voltage controller 90 supplies a second power source voltage (ELVSS') controlled as the optimized EL voltage value to the corresponding pixel.

With reference to FIG. 8B, during the period T4 in which an image data signal corresponding to the pixel is received according to the external video signal and the image is displayed, the second power source voltage (ELVSS') is set as the EL voltage value controlled by the voltage controller 90. The second power source voltage (ELVSS'), a low level voltage, is acquired by applying the first voltage and the second voltage and adding a predetermined common voltage margin. Therefore, the effect of repeated use and aging of the driving transistor (Md) of the corresponding pixel is offset in the first voltage, and the operation voltage in the saturation region and performance characteristic information of the OLED are applied to the second voltage, such that the controlled second power source voltage (ELVSS') is the optimized voltage for minimizing power consumption and driving the pixel.

During the period T4 in which the pixel is driven by the controlled second power source voltage (ELVSS'), the scan signal (S[n]) transmitted to the scan line of the corresponding pixel in FIG. 8B is transmitted at a low level so the first transistor M1 is turned on. As a result, the gate signal (G[n]) transmitted to the corresponding gate line and the sense signal (SE[n]) transmitted to the corresponding sense line are transmitted at the high voltage level so the second transistor M2 and the sense transistor M3 are turned off.

Therefore, the image data signal (D[m]) is transmitted from the corresponding data line through the first transistor M1 to apply the corresponding data voltage to the first node N1. The data voltage following the image data signal (D[m]) is stored in the storage capacitor Cst connected to the first node N1 for a predetermined period, and the corresponding driving current (Id) is transmitted to the OLED through the channel region of the driving transistor (Md). The OLED emits light by the light with the luminance caused by the driving current (Id).

The driving voltage for displaying the image through light emission of the OLED is optimized by the second power source voltage (ELVSS') controlled by the voltage controller 90, so the present invention can prevent an increase of power consumption by applying the performance of the OLED or the aging characteristic of the driving transistor (Md) providing the common margin of the power source voltage.

The process for controlling the power source voltage according to the embodiment of the present invention can calculate the optimized EL voltage value for reducing power consumption while driven to compensate performance of the OLED or the aging characteristic of the driving transistor.

The voltage controller can compensate the voltage for all pixels of the display or some selected pixels. In the exemplary embodiment of selecting the pixel and controlling the voltage, the display selects pixel columns with a predetermined interval for each pixel column and acquires voltage information on a plurality of pixels included in the selected pixel column. However, such selection method can be randomly determined and is not restricted. According to some embodiments which describe selectively sampling the pixel to acquire voltage information, the EL voltage is set by using the peak value of the measured voltage value or calculating the mean and the variance of the measured voltage value.

Additionally, the voltage compensation process can be performed before the OLED display is produced, periodically according to the progress of the display device using time or intermittently through the user's manual manipulation.

In the OLED display according to some embodiments, the sensor 70 may be formed directly as part of the source IC, or it may be installed on a driving board by using a discrete element. In the example in which the sensor 70 is formed directly in the source IC, the circuit integrated area is increased since it no additional board is required. In the example in which the sensor 70 is connected through a discrete element on a driving board, the circuit configuration is simplified such that a manufacturing process is simplified.

The disclosed embodiments has been made in an effort to provide a method for driving an OLED display for preventing needless power consumption caused by unnecessarily applying a power source voltage to the display panel. Rather, efficient driving of the display device with an optimal driving voltage in consideration of the characteristics of the pixels that based on a measured reduction of performance of the pixels due to use is performed.

The technical problems to be addressed by the disclosed embodiments are not limited to the technical problems described in the Background section, and therefore other technical problems can be clearly understood by those skilled in the art to which the present invention pertains from the above described embodiments.

According to one embodiment, an organic light emitting diode (OLED) display is disclosed. The OLED display includes a plurality of pixels including an OLED and a driving transistor configured to supply a driving current according to an image data signal to the OLED, a sensor configured to sense a first current flowing to the driving transistor based on a source data input signal according to a target luminance value, and measure an operation voltage of a saturation region of the driving transistor and performance information regarding reduced performance of the OLED by using a current amount equal to the first current, a voltage controller configured to determine a minimum electroluminescence voltage for driving the plurality of pixels by using the measured performance information, a power supply configured to control a power source voltage applied to the plurality of pixels according to the determined electroluminescence voltage, and a controller configured to control image display of the plurality of pixels, the controller further configured to drive the sensor, the voltage controller, and the power supply.

The OLED display includes a data driver for providing the image data signal to a plurality of pixels, and the data driver transmits the source data input signal to the pixels when the image data signal is not supplied.

The OLED display includes a sense driver for generating a plurality of sense signals and transmitting the same to a plurality of sense lines connected to the plurality of pixels, and the sensor senses the first current in response to the sense signal.

The plurality of pixels are respectively connected to: a scan line for receiving a corresponding scan signal from among a plurality of scan signals; a gate line for receiving a corresponding gate signal from among a plurality of gate signals; a data line for receiving a corresponding image data signal from among a plurality of image data signals; a sense line for receiving a corresponding sense signal from among a plurality of sense signals; and a first connecting line connected to the sensor.

The plurality of pixels respectively include: a switching transistor for transmitting an image data signal in response to the scan signal; a first transistor for operating a driving transistor in a saturation region by connecting the driving transistor to the OLED in response to the gate signal; and a sense transistor for transmitting a first current corresponding to a source data input signal to the sensor from the driving transistor in response to the sense signal.

The driving transistor included in the respective pixels includes a gate electrode connected to a first node, a first electrode connected to a first power source voltage (ELVDD), and a second electrode connected to a second node.

The switching transistor included in the respective pixels includes a gate electrode connected to a corresponding scan line, a first electrode connected to a corresponding data line, and a second electrode connected to the first node.

The first transistor included in the respective pixels includes a gate electrode connected to a gate line, and a first electrode and a second electrode connected to the first node and the second node, respectively.

The first transistor connects the driving transistor to the OLED be operable in the saturation region when its switching is turned on.

The sense transistor included in the respective pixels includes a gate electrode connected to a corresponding sense line, a first electrode connected to the second node, and a second electrode connected to a second connecting line for connecting the pixels and the sensor.

The respective pixels include a storage capacitor for maintaining the voltage corresponding to the data signal for a predetermined time, and the storage capacitor includes a first electrode connected to first power source voltage (ELVDD) and a second electrode connected to the first node.

The scan signal is transmitted with a gate on voltage level of the switching transistor when transmitting the source data input signal or the image data signal to the plurality of pixels.

The gate signal is transmitted with a gate on voltage level of the first transistor when the current is sunk from the driving transistor of the plurality of pixels or the current is supplied to the OLED of the pixels.

The sense signal is transmitted with a gate on voltage level of the sense transistor when sensing the first current corresponding to the source data signal by transmitting the first current to the sensor from the driving transistor of the pixels.

The controller controls driving of the voltage controller or the power supply to maintain a cathode voltage of the OLED at a high level voltage that is greater than a predetermined voltage so that the current may not flow to the OLED during a period in which the first current is sensed and a period in which an operation voltage of a saturation region of the driving transistor is measured, and it maintains the cathode voltage of the OLED at a low level voltage that is less than a predetermined voltage so that the current may flow to the OLED during a period in which performance information of the OLED is measured.

The sensor includes: a current sensor for sensing the first current from the plurality of pixels; a current sink for sinking a second current having the same current amount as the first current from the plurality of pixels; a current source for supplying a third current having the same current amount as the first current to the plurality of pixels; and an analog digital converter for receiving voltage information applied to the current sensor, the current sink, and the current source, and converting the same into a digital value.

The current sink and the current source are connected in common to a first connecting line connected to the plurality of pixels, and the current sensor is connected to a second connecting line connected to the plurality of pixels.

The current sink and the current source are connected in common to a first connecting line connected to the plurality of pixels, and the current sensor is connected to a plurality of data lines for supplying an image data signal to the plurality of pixels.

The plurality of data lines respectively include a switch for selectively connecting one of the current sensor and the data driver for supplying the image data signal to the plurality of pixels to the plurality of data lines.

The switch includes a pair of selecting switches for each channel of the plurality of data lines, and the pair of switches include a first selecting switch provided between the data driver and a corresponding data line from among the plurality of data lines and transmitting the image data signal to a corresponding pixel from among the plurality of pixels when it is turned on, and a second selecting switch provided between the current sensor and the corresponding data line and receiving a sensing current from the corresponding pixel when it is turned on.

The current sink includes a first switch for operating the current sink when it is turned on in response to the first switch control signal, and the current source includes a second switch for operating the current source when it is turned on in response to the second switch control signal.

The sensor is realized in a source integrated circuit of the OLED display or a discrete element separated from the source integrated circuit.

The determined electroluminescence voltage is a first power source voltage (ELVDD) or a second power source voltage (ELVSS) provided to the plurality of pixels by the power supply.

The electroluminescence voltage is determined in consideration of a predetermined voltage margin and a summation of the operation voltage of the saturation region of the driving transistor measured by the sensor and the voltage of the OLED.

The sensor, the voltage controller, and the power supply are periodically operated when the OLED display are turned on or off, and they are randomly operated according to the user's selection of a mode.

According to another embodiment, a method for driving an organic light emitting diode (OLED) display is disclosed. The method includes transmitting a source data input signal according to target luminance to a driving transistor included in a plurality of respective pixels, and sensing a first current flowing to the driving transistor in response to the source data input signal, measuring an operation voltage of a saturation region of the driving transistor by sinking a second current having the same current amount as the first current from the driving transistor, measuring information indicative of a level of performance of the OLED by supplying a third current having the same current amount as the first current to an OLED included in the plurality of pixels, determining a minimum electroluminescence voltage for driving the plurality of pixels by using the operation voltage of the saturation region of the measured driving transistor and the measured performance information controlling a power source voltage applied to the plurality of pixels according to the determined electroluminescence voltage, and supplying the controlled power source voltage.

While the sensing of a first current and the measuring of an operation voltage of a saturation region of the driving transistor are performed, a cathode voltage of the OLED is maintained at a high level voltage that is greater than a predetermined voltage so that no current may flow to the OLED.

While measuring performance information of the OLED is performed, a cathode voltage of the OLED is maintained at a low level voltage that is less than a predetermined voltage so that the current may flow to the OLED.

The source data input signal according to the target luminance is transmitted when the image data signal is not supplied to the plurality of pixels.

The first current information, the operation voltage information of the saturation region of the measured driving transistor, and the performance information of the OLED are stored as information on a plurality of all the pixels or the selected pixel from among the pixels.

The sensing of a first current and the measuring of an operation voltage of a saturation region of a driving transistor are performed for the same current sink circuit.

While the measuring of an operation voltage of a saturation region of a driving transistor or the measuring of performance information of the OLED is performed, a first transistor for connecting the driving transistor to the OLED is turned on.

The second current and the third current are transmitted through a first connecting line for connecting a current sink for sinking the second current and a current source for supplying the third current to the plurality of pixels in common.

The first current is sensed through a plurality of data lines for connecting the plurality of pixels and a data driver for supplying an image data signal to the pixels, or it is sensed through a second connecting line for connecting a current sensor for sensing the first current and the plurality of pixels.

The respective stages are periodically performed when the OLED display is turned on or off, or they are randomly performed according to the user's selection of a mode.

According to the present invention, power consumption of the OLED display can be reduced by applying a minimum amount of the optimized driving voltage considering the characteristic of the aging of the display panel.

Also, the present invention provides an OLED display for substantially reducing power consumption irrespective of the layout size and the production cost by configuring a circuit for relatively simply providing the optimized driving voltage to the OLED display.

Although some embodiments are described above with reference to the corresponding figures, these embodiments are by way of example only and the present invention is not limited thereto. A person of ordinary skill in the art may change or modify the described exemplary embodiments without departing from the scope of the present invention, and these changes or modifications are also included in the scope of the present invention. Further, materials of each components described in the present specification may be selected or replaced from various materials known to a person of skill in the art. In addition, a person of skill in the art may omit some of the components described in the present specification without reducing the performance or add components in order to improve the performance. Furthermore, a person of skill in the art may change a sequence of processes described in the present specification according to the process environments or equipment. Therefore, the scope of the present invention should be defined by the appended claims and equivalents, and not by the described exemplary embodiments.

What is claimed is:

1. An organic light emitting diode (OLED) display comprising:

a plurality of pixels including an OLED and a driving transistor configured to supply a driving current according to an image data signal to the OLED, the plurality of pixels comprising:

a switching transistor configured to transmit an image data signal in response to a scan signal;

a first transistor connected to a gate electrode of the driving transistor at a first node and to a drain electrode of the driving transistor, and configured to operate the driving transistor in a saturation region by connecting the driving transistor to the OLED in response to a gate signal, and the first node connected to a first connecting line; and a sense transistor configured to transmit a first current corresponding to a source data input signal to the sensor from the driving transistor in response to a sense signal; and a sensor configured to measure performance information by:

sensing a first current flowing to the driving transistor through the first connecting line connected to the first node and the sensor based on a source data input signal according to a target luminance value;

measuring an operation voltage of a saturation region of the driving transistor; and sensing an OLED voltage by using a current amount equal to the first current, the OLED voltage being indicative of a level of performance of the OLED;

a voltage controller configured to determine a minimum electroluminescence voltage for driving the plurality of pixels by using the measured performance information;

a power supply configured to control a power source voltage applied to the plurality of pixels according to the determined electroluminescence voltage; and a controller configured to control image display of the plurality of pixels, the controller further configured to drive the sensor, the voltage controller, and the power supply.

2. The organic light emitting diode display of claim 1, wherein the OLED display includes a data driver configured to provide the image data signal to a plurality of pixels, and the data driver transmits the source data input signal to the pixels when the image data signal is not supplied.

3. The organic light emitting diode display of claim 1, wherein the OLED display includes a sense driver configured to generate a plurality of sense signals and transmit the same to a plurality of sense lines connected to the plurality of pixels, and the sensor is configured to sense the first current in response to the sense signal.

4. The organic light emitting diode display of claim 1, wherein the plurality of pixels are respectively connected to:

a scan line configured to receive a corresponding scan signal from among a plurality of scan signals;

a gate line configured to receive a corresponding gate signal from among a plurality of gate signals;

a data line configured to receive a corresponding image data signal from among a plurality of image data signals; and a sense line configured to receive a corresponding sense signal from among a plurality of sense signals.

5. The organic light emitting diode display of claim 4, wherein the scan signal is transmitted with a gate on voltage level of the switching transistor when transmitting the source data input signal or the image data signal to the plurality of pixels.

6. The organic light emitting diode display of claim 4, wherein the gate signal is transmitted with a gate on voltage level of the first transistor when the current is sunk from the driving transistor of the plurality of pixels or the current is supplied to the OLED of the pixels.

7. The organic light emitting diode display of claim 4, wherein the sense signal is transmitted with a gate on voltage level of the sense transistor when sensing the first current corresponding to the source data signal by transmitting the first current to the sensor from the driving transistor of the pixels.

8. The organic light emitting diode display of claim 1, wherein the controller is configured to control driving of the voltage controller or the power supply to maintain a cathode voltage of the OLED at a high level voltage that is greater than a predetermined voltage in order to stop current from flowing to the OLED during a period in which the first current is sensed and a period in which an operation voltage of a saturation region of the driving transistor is measured, and wherein the controller is configured to maintain the cathode voltage of the OLED at a low level voltage that is less than a predetermined voltage so that the current may flow to the OLED during a period in which the information of the OLED is measured.

9. The organic light emitting diode display of claim 1, wherein the sensor includes:

a current sensor configured to sense the first current from the plurality of pixels;

a current sink configured to sink a second current having the same current amount as the first current from the plurality of pixels;

a current source configured to supply a third current having the same current amount as the first current to the plurality of pixels; and an analog digital converter configured to receive voltage information applied to the current sensor, the current sink, and the current source, and convert the received voltage information into a digital value.

10. The organic light emitting diode display of claim 9, wherein the current sink and the current source are connected in common to the first connecting line, and the current sensor is connected to a second connecting line connected to the plurality of pixels.

11. The organic light emitting diode display of claim 9, wherein the current sink and the current source are connected in common to the first connecting line, and the current sensor is connected to a plurality of data lines for supplying an image data signal to the plurality of pixels.

12. The organic light emitting diode display of claim 11, wherein the plurality of data lines respectively include a switch for selectively connecting one of the current sensor and the data driver, wherein the switch is set to an on position to supply the image data signal to the plurality of pixels to the plurality of data lines.

13. The organic light emitting diode display of claim 12, wherein the switch includes a pair of selecting switches for each channel of the plurality of data lines, and the pair of switches include a first selecting switch positioned between the data driver and a corresponding data line from among the plurality of data lines and transmitting the image data signal to a corresponding pixel from among the plurality of pixels when it is turned on, and a second selecting switch positioned between the current sensor and, the corresponding data line and receiving a sensing current from the corresponding pixel when it is turned on.

14. The organic light emitting diode display of claim 9, wherein the current sink includes a first switch for operating the current sink when it is turned on in response to the first switch control signal, and the current source includes a second switch for operating the current source when it is turned on in response to the second switch control signal.

15. The organic light emitting diode display of claim 9, wherein the sensor is realized in a source integrated circuit of the OLED display or a discrete element separated from the source integrated circuit.

16. The organic light emitting diode display of claim 1, wherein the determined electroluminescence voltage is a first power source voltage or a second power source voltage provided to the plurality of pixels by the power supply.

17. The organic light emitting diode display of claim 1, wherein the electroluminescence voltage is determined in consideration of a predetermined voltage margin and a summation of the operation voltage of the saturation region of the driving transistor measured by the sensor and the voltage of the OLED.

18. The organic light emitting diode display of claim 1, wherein the sensor, the voltage controller, and the power supply are periodically operated when driving the OLED display is turned on or off, or wherein the sensor, the voltage controller, and power supply are variably operated according to mode selection signal.

* * * * *